(12) United States Patent  
Yun (10) Patent No.: US 8,982,403 B2
(45) Date of Patent: Mar. 17, 2015

(54) SYSTEM AND METHOD FOR CONTEXT-AWARE PRINTING SERVICE

(71) Applicant: Samsung Electronics Co., Ltd., Suwon-si (KR)

(72) Inventor: Tae-jung Yun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/259,764

(22) Filed: Apr. 23, 2014

(65) Prior Publication Data

US 2015/0029544 A1    Jan. 29, 2015

(30) Foreign Application Priority Data

Jul. 29, 2013  (KR) .......................... 10-2013-0089829

(51) Int. Cl.
*G06F 15/00* (2006.01)
*G06F 3/12* (2006.01)
*G06K 1/00* (2006.01)

(52) U.S. Cl.
CPC ............ *G06F 3/1292* (2013.01); *G06F 3/1271* (2013.01); *G06F 3/126* (2013.01); *G06F 3/1204* (2013.01)
USPC ........................................ 358/1.15; 358/1.14

(58) Field of Classification Search
CPC ....... G06F 3/1292; G06F 3/1271; G06F 3/126; G06F 3/1204
USPC ........................................ 358/1.15, 1.14, 1.1
See application file for complete search history.

(56) References Cited

U.S. PATENT DOCUMENTS

| 2010/0214614 | A1 | 8/2010 | Ferlitsch et al. |
| 2011/0283345 | A1 | 11/2011 | Kamei et al. |
| 2013/0063774 | A1* | 3/2013 | Nuggehalli et al. ......... 358/1.15 |
| 2013/0111544 | A1 | 5/2013 | Balinsky et al. |
| 2013/0307997 | A1* | 11/2013 | O'Keefe et al. ............ 348/207.1 |

FOREIGN PATENT DOCUMENTS

JP    2011-238185    11/2011

* cited by examiner

*Primary Examiner* — Douglas Tran
(74) *Attorney, Agent, or Firm* — Staas & Halsey LLP (57) ABSTRACT

A method of providing a context-aware printing service includes storing schedule information of a user; storing contents related with the schedule; identifying a location of a mobile terminal of the user and a current time; determining whether the identified location and the identified time are consistent with the schedule information; transmitting a guide message to print out the contents to the mobile terminal if the identified location and the identified time are consistent with the schedule information; sending, by the mobile terminal, a printing request to an image forming apparatus; and printing out the contents.

20 Claims, 9 Drawing Sheets

SYSTEM AND METHOD FOR CONTEXT-AWARE PRINTING SERVICE

CROSS-REFERENCE TO RELATED APPLICATIONS

This application claims the priority benefit of Korean Patent Application No. 10-2013-0089829, filed on Jul. 29, 2013, in the Korean Intellectual Property Office, the disclosure of which is incorporated herein in their entirety by reference.

BACKGROUND

1. Field

One or more embodiments relate to a method and system for recognizing the contexts of users and providing a printing service corresponding to the recognized contexts.

2. Description of the Related Art

In a ubiquitous environment, the utilization of a context-aware service for recognizing the contexts of users based on collected user context information and providing proper services according to the contexts of the users via a process such as analysis and inference has been increased.

Recently, a network printing system using mobile terminal like smart phones or tablet PCs, multifunction printers and server-connected networks has been widely used. In such a network printing system, users may simply send printing requests to multifunction printers through their mobile terminal, and the multifunction printers may receive data through a wireless communication with a server and print out the received data.

SUMMARY

In an aspect of one or more embodiments, there is provided a method and system for recognizing contexts of users and providing a network printing service according to the recognized contexts by applying a context-aware service to a network printing system.

In an aspect of one or more embodiments, there is provided a method of context-aware service which includes: storing schedule information of a user; storing contents related with the schedule; identifying a location of mobile terminal of the user and a current time; determining whether the identified location and the identified time are consistent with the schedule information; transmitting a guide message for printing out the contents related with the schedule to the mobile terminal if the identified location and the identified time are consistent with the schedule information; sending a printing request to an image forming apparatus through the mobile terminal; and printing out the contents through the image forming apparatus.

The schedule information may be stored in a schedule management server, the contents related with the schedule may be stored in a content management server, and a context-aware server linked to the schedule management server and the content management server may acquire the stored schedule information and contents.

In the identifying operation, the context-aware server may identify the location of the mobile terminal based on a location of an access point accessed by the mobile terminal.

In the determining operation, the context-aware server may determine whether a location and a time of the schedule, which is included in the schedule information, are consistent with the identified location and the identified time.

In the transmitting operation, a message including information that there are the contents related with the schedule and identification information of the image forming apparatus capable of printing out the contents may be transmitted.

In the print requesting operation, the mobile terminal may be near field communication (NFC) tagged on the image forming apparatus.

The printing operation may include: performing user authentication through the context-aware server; transmitting, by the context-aware server, the contents to the image forming apparatus if the user authentication is succeeded; and printing out the received contents through the image forming apparatus.

The authenticating operation may include: receiving, by the mobile terminal, device information stored in a NFC tag of the image forming apparatus; transmitting the received device information and the user information stored in the mobile terminal to the context-aware server; and performing the user authentication by using the device information and the user information through the context-aware server.

Other users who share the schedule information may be registered to the schedule management server, and the additionally registered users may also have authority to store the contents related with the schedule in the contents management server.

The image forming apparatus and/or the mobile terminal may provide a preview before printing out the contents.

In an aspect of one or more embodiments, there is provided a context-aware printing service system which includes: mobile terminal; a schedule management server for storing schedule information of a user; a content management server for storing contents related with the schedule stored in the schedule management server; a context-aware server linked to the schedule management server and the content management server, for acquiring the stored schedule information and the contents, identifying a location of the mobile terminal and current time, determining whether the identified location of the mobile terminal and the current time are consistent with the schedule information, and transmitting a guide message to print out the contents to the mobile terminal when the location of the mobile terminal and the current time are consistent with the schedule information; and an image forming apparatus for printing out the contents according to a printing request sent by the mobile terminal.

The context-aware server may identify the location of the mobile terminal based on a location of an access point accessed by the mobile terminal.

The context-aware server may also determine whether a location and time of the schedule included in the schedule information are consistent with the identified location and the identified time.

A message transmitted by the context-aware server to the mobile terminal may include information that there are the schedule-related contents and identification information of the image forming apparatus capable of printing out the contents.

The mobile terminal may send a printing request by being NFC tagged on the image forming apparatus.

The context-aware server may transmit the contents to the image forming apparatus when the user authentication is successfully performed.

The mobile terminal may receive the device information stored in a NFC tag of the image forming apparatus, and transmit the received device information and the user information stored in the mobile terminal to the context-aware server. The context-aware server may perform the user authentication by using the device information and the user information.

The schedule management server may register other users sharing the schedule information and the additionally registered users may also have authority to store the contents related with the schedule in the content management server.

The image forming apparatus and/or the mobile terminal may provide a preview of the schedule information before printing the contents.

In an aspect of one or more embodiments, there is provided at least one non-transitory computer readable medium storing computer readable instructions which when executed control at least one processor to implement methods of embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings. In this regard, embodiments may have different forms and should not be construed as being limited to the descriptions set forth herein.

Figure 1:
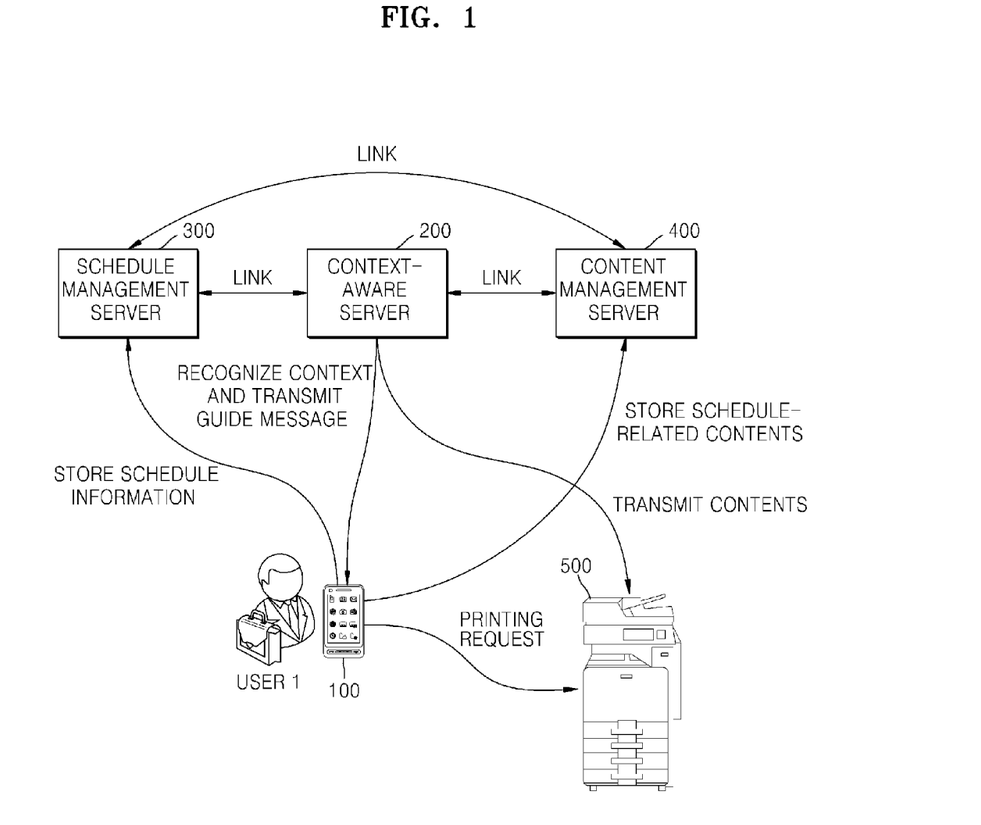
FIG. 1 is a schematic view of a context-aware printing service providing system according to an embodiment.

FIG. 1 is a schematic view of a context-aware printing service system according to an embodiment. The context-aware printing service system recognizes contexts of users after collecting context information of users and provides a proper printing service according to the recognized contexts. In detail, if there are contents related with a schedule of a user and it is determined that the user is situated at the time and on the location to perform the schedule when considering the contexts of the user, a service supporting to print out the schedule-related contents is provided to the user.

For example, when a meeting in which the user is to participate is scheduled and documents necessary for the meeting exist, the context-aware printing service system figures out the location and time of the user, and supports the user to print out the necessary documents at the scheduled location and the scheduled time of the meeting. A detailed description thereof will be given below with reference to the attached drawings.

Referring to FIG. 1, the context-aware printing service system according to an embodiment may include a mobile terminal 100, a context-aware server 200, a schedule management server 300, a content management server 400, and a multifunction printer 500.

The mobile terminal 100 is a wireless communication device such as a smart phone or a tablet PC that a user 1 carries. Since the user 1 mostly holds the mobile terminal 100 in the daily life, the location of the mobile terminal 100 may be considered as that of the user 1. Also, the user 1 may receive a printing guide message through the mobile terminal 100 and may conveniently print contents by requesting the multifunction printer 500 for printing through the mobile terminal 100.

The schedule management server 300 stores schedule information of the user 1. For example, the schedule management server 300 may be a platform providing a schedule management service like a Google calendar. The user 1 may store the schedule information in the schedule management server 300 through a schedule management application installed in the mobile terminal 100 or an application installed in a PC. The schedule information to be stored refers to information including the contents, location, and time of a schedule that the user 1 is to perform. For instance, the date, time, and location of a meeting may be stored as the schedule information.

The content management server 400 stores and manages schedule-related contents stored in the schedule management server 300. The content management server 400 may be an email server or a cloud storage server, or may be a date sharing platform like the SharePoint. The content management server 400 is linked with the schedule management server 300 so that the user 1 may store, in the content management server 400, the schedule-related contents stored in the schedule management server 300. For example, documents necessary for the meeting may be stored in the content management server 400 to correspond to the meeting schedule stored in the schedule management server 300.

In the present embodiment, the schedule management server 300 and the content management server 400 are prepared separately. However, one management server may store and manage the schedule information and the schedule-related contents.

The context-aware server 200 recognizes the contexts of the user 1, and transmits a printing guide message to the mobile terminal 100 of the user 1. In detail, the context-aware server 200 figures out the location of the user 1 and a current time, and determines whether the recognized location and time are consistent with the schedule information stored in the schedule management server 300. To this end, the context-aware server 200 is linked with the schedule management server 300 and shares the schedule information stored in the schedule management server 300.

The context-aware server 200 may identify the location of the mobile terminal 100, and regard the identified location of the mobile terminal 100 as that of the user 1. The identification of the location of the mobile terminal 100 may be based on the location information of an access point accessed by the mobile terminal 100, or based on a location of a base station that produces a 3 Generation (3G) network.

The printing guide message transmitted by the context-aware server 200 to the mobile terminal 100 may include the information that there are schedule-related contents. In addition, the printing guide message may include information indicating a multifunction printer capable of printing the schedule-related contents. To this end, the context-aware server 200 may be linked with the content management server 400 to share the contents stored in the content management server 400.

When the multifunction printer 500 receives a printing request from the mobile terminal 100, the multifunction printer 500 receives the schedule-related contents from the context-aware server 200 and prints out the schedule-related contents. The multifunction printer 500 may receive a request for printing from the mobile terminal 100 through Near Field Communication (NFC) tagging. The multifunction printer 500 may provide a preview for contents before final printing.

Operations of a context-aware printing service providing method according to an embodiment will now be described more fully with reference to FIGS. 2 through 5. In the present embodiment, a user has a meeting schedule, stores meeting-related documents in a server, and prints out the meeting-related documents through a context-aware service.

Figure 2:
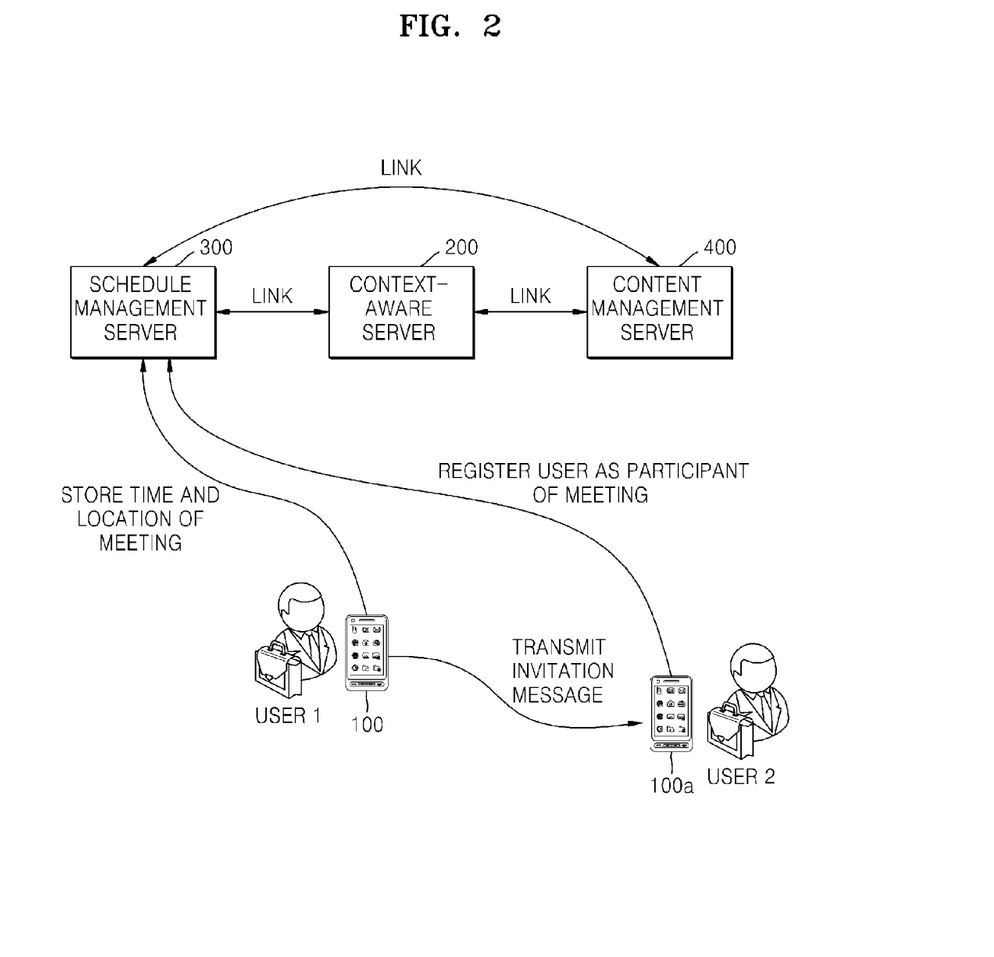
FIGS. 2 through 5 are schematic views for respectively describing operations for performing a context-aware printing service according to an embodiment.

FIG. 2 is a schematic view illustrating an operation of storing a meeting schedule. Referring to FIG. 2, a user 1 may register the time and location of a meeting as his or her schedule. For example, when the user 1 inputs the time and location of the meeting through a schedule management application installed in the mobile terminal 100, the inputted meeting time and location are stored as schedule information in the schedule management server 300. When the meeting time and location are stored in the schedule management server 300, the context-aware server 200 linked with the schedule management server 300 acquires the stored meeting time and location.

As described in FIG. 2, a plurality of users may share one schedule. A service may be provided more effectively by registering a plurality of users in relation to a meeting schedule. The plurality of users may be registered in various ways. For example, the user 1 who has already registered the meeting schedule may send an invitation message to a mobile terminal 100a of a user 2 who has not yet registered any meeting schedule. When the user 2 accepts the invitation message, the user 2 may be automatically registered as a meeting participant. If a meeting schedule that the user 2 registered in the schedule management server 300 is identical with the meeting schedule that the user 1 registered, the user 2 may become a meeting participant.

Figure 3:
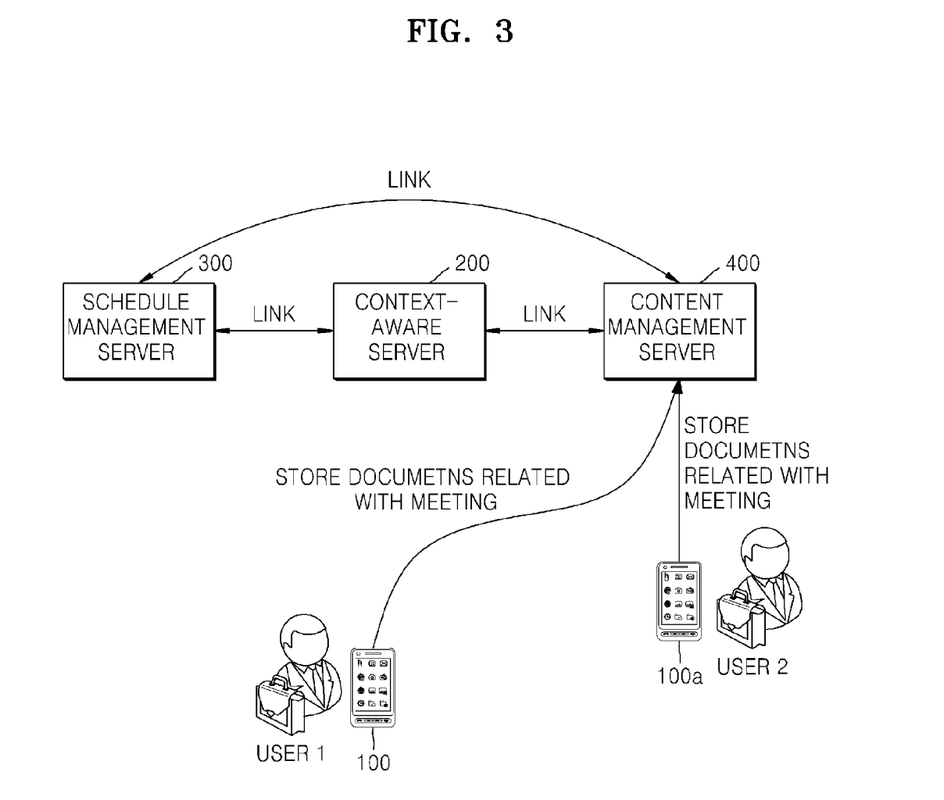

FIG. 3 is a schematic view describing an operation of storing documents related with the meeting. Referring to FIG. 3, the user 1 may store meeting-related documents in the content management server 400 through the mobile terminal 100. In this case, the user 2 registered as another participant of the meeting may also store meeting related documents in the content management server 400 through the mobile terminal 100a. Therefore, the plurality of users registered as the meeting participants in the schedule management server 300 may share the document files necessary for the meeting.

The users may store the meeting-related documents in the content management server 400 through other devices like PCs.

Figure 4:
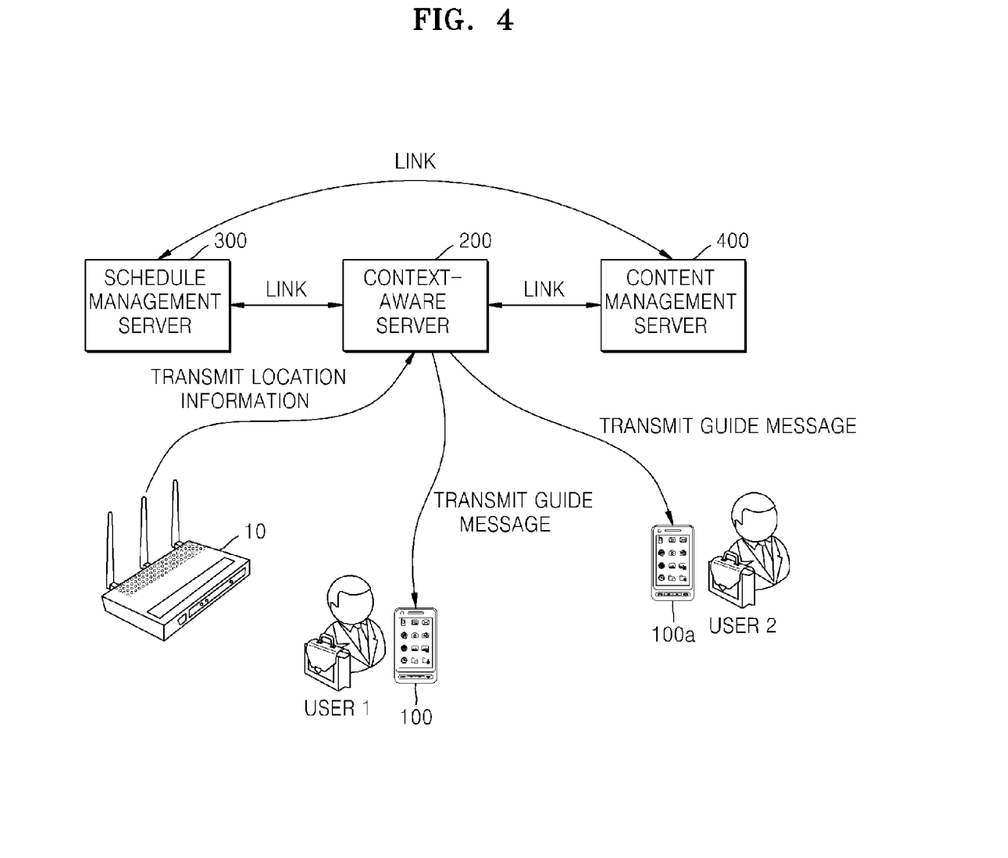

FIG. 4 is a schematic view describing an operation of recognizing contexts and transmitting guide messages. Referring to FIG. 4, the context-aware server 200 may receive location information from an access point 10 accessed by the mobile terminal 100 and 100a, and identify the locations of the mobile terminal 100 and 100a.

For example, if the users approach a meeting room, where the meeting is to be held, on the scheduled meeting time, the mobile terminal 100 and 100a of the users 1 and 2 may access the access point 10 close to the meeting room, and perform Wi-Fi communication. At this time, when the access point 10 near the meeting room transmits the location information to the context-aware server 200, the context-aware server 200 may determine that the mobile terminal 100 and 100a are located near the meeting room and the users 1 and 2 have arrived around the meeting room. The context-aware server 200 may identify the locations of mobile terminal in diverse ways, such as, by receiving the location information from base stations producing 3G networks in addition to the way of receiving the location information from the access point 10.

Also, the context-aware server 200 identifies the current time and determines whether the identified time is identical with the scheduled meeting time stored in the schedule management server 300. Although the identified time is not completely equal to the stored meeting time, the identified time and the stored time may be considered the same as long as the identified time is close to the stored time.

The context-aware server 200 sends guide messages to the mobile terminal of users 100 and 100a if the identified time and location are the same as the time and location stored in the schedule management server 300. That is, if it is determined that the time for meeting gets closer and the participants have arrived near the meeting room, the context-aware server 200 sends the guide messages to the mobile terminal 100 and 100a of the users 1 and 2. The guide messages are messages for guiding the printing of meeting related documents, and may include the contents that there are meeting-related documents and the meeting-related documents are able to be printed. The guide messages may also include information related with which multifunction printer may print out the meeting related documents. For example, a guide message may be generated, saying that "there are new documents necessary for the meeting. A multifunction printer (ID: XXX) next to a meeting room 4 can print out the documents." The IDs and locations of multifunction printers are stored in the context-aware server 200, and thus the context-aware server 200 may guide users to print out the documents through the multifunction printer closest to the location of meeting.

Figure 5:
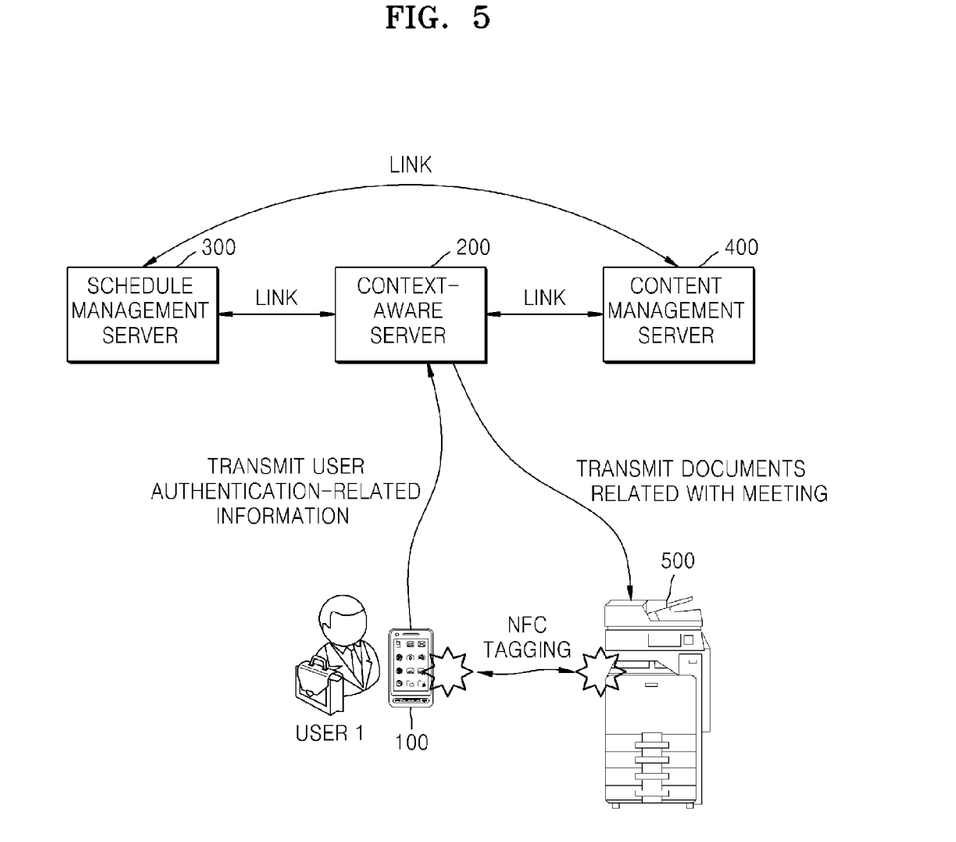

FIG. 5 is a schematic view illustrating an operation of printing the documents related with the meeting according to requests for printing. The user 1 may send a request for printing to the multifunction printer 500 according to the guide message received from the mobile terminal 100. In this case, the user 1 may request the multifunction printer 500 for printing by approaching the mobile terminal 100 to the multifunction printer 500 and performing NFC tagging. When the NFC tagging is performed, the mobile terminal 100 may read device information and the like of the multifunction printer 500 from an NFC tag attached to the multifunction printer 500. When user information related with the user 1 stored in the mobile terminal 100 along with the device information read by the mobile terminal 100 are transmitted to the context-aware server 200, the context-aware server 200 performs authentication for checking whether the user 1 has the authority to print out the documents, by using the received device information and the received user information.

If the authentication is succeeded, the context-aware server 200 transmits the meeting related documents to the multifunction printer 500, and the multifunction printer 500 prints out the meeting related documents.

As such, if a user approaches a predetermined meeting room on a scheduled time, the user may be informed of meeting-related documents and a multifunction printer available for printing out the documents, thus enabling the user to print out the meeting-related documents easily and conveniently. Also, the user may print out the meeting related documents by performing only simple actions such as NFC tagging through his or her mobile terminal.

Figure 6:
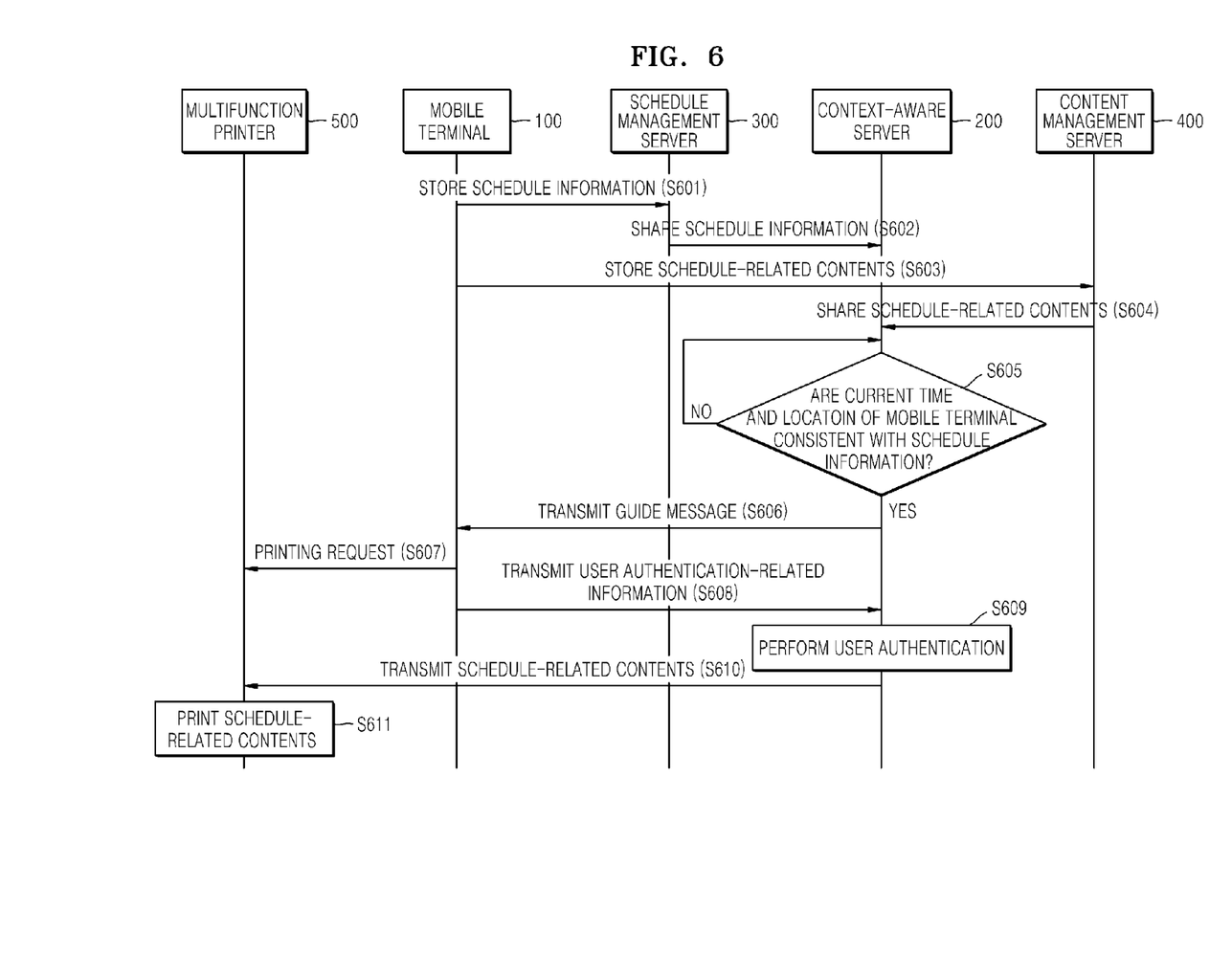
FIG. 6 is a flowchart of actions between elements included in the context-aware printing service providing system of FIG. 1 when the context-aware printing service according to an embodiment.

FIG. 6 is a flowchart of operations of each element included in the system when performing the context-aware printing system according to an embodiment. Referring to FIG. 6, the mobile terminal 100 stores the schedule information in the schedule management server 300 in operation S601. In this regard, the stored schedule information denotes information including the contents, locations and time of a schedule performed by the user 1.

When the schedule information is stored in the schedule management server 300, the context-aware server 200 shares the stored schedule information. To this end, the context-aware server 200 needs to be linked with the schedule management server 300 in operation S602. In operation S603, the mobile terminal 100 stores the contents related with the schedule in the content management server 400. In operation S604, the context-aware server 200 shares the stored contents related with the schedule. To this end, the context-aware server 200 needs to be linked to the schedule management server 300.

In operation S605, the context-aware server 200 identifies the current time and the location of the user 1, and determines whether the identified time and the identified location are consistent with the schedule information stored in the schedule management server 300. At this time, the location of the mobile terminal 100 is identified in order to figure out the location of the user 1, and the identified location of the mobile terminal 100 is regarded as the location of the user 1.

If it is determined in operation S605 that the identified time and the identified location are consistent with the schedule information stored in the schedule management server 300, the context-aware server 200 transmits a guide message to the mobile terminal 100, in operation S606. The guide message may include the contents that there are contents related with the schedule. The guide message may also include the identification information of a multifunction printer capable of printing out the contents related with the schedule.

The mobile terminal 100 requests the multifunction printer 500 to print out the contents, in operation S607, and transmits authentication-related information to the context-aware server 200, in operation S608. Using the received information related with the authentication, the context-aware server 200 performs authentication for checking whether the user 1 holding the mobile terminal 100 is a person having authority to print out the contents related with the schedule in operation S609. When the authentication is succeeded, the context-aware server 200 transmits the schedule-related contents to the multifunction printer 500 in operation S610, and the multifunction printer 500 prints out the received schedule-related contents in operation S611.

Figure 7:
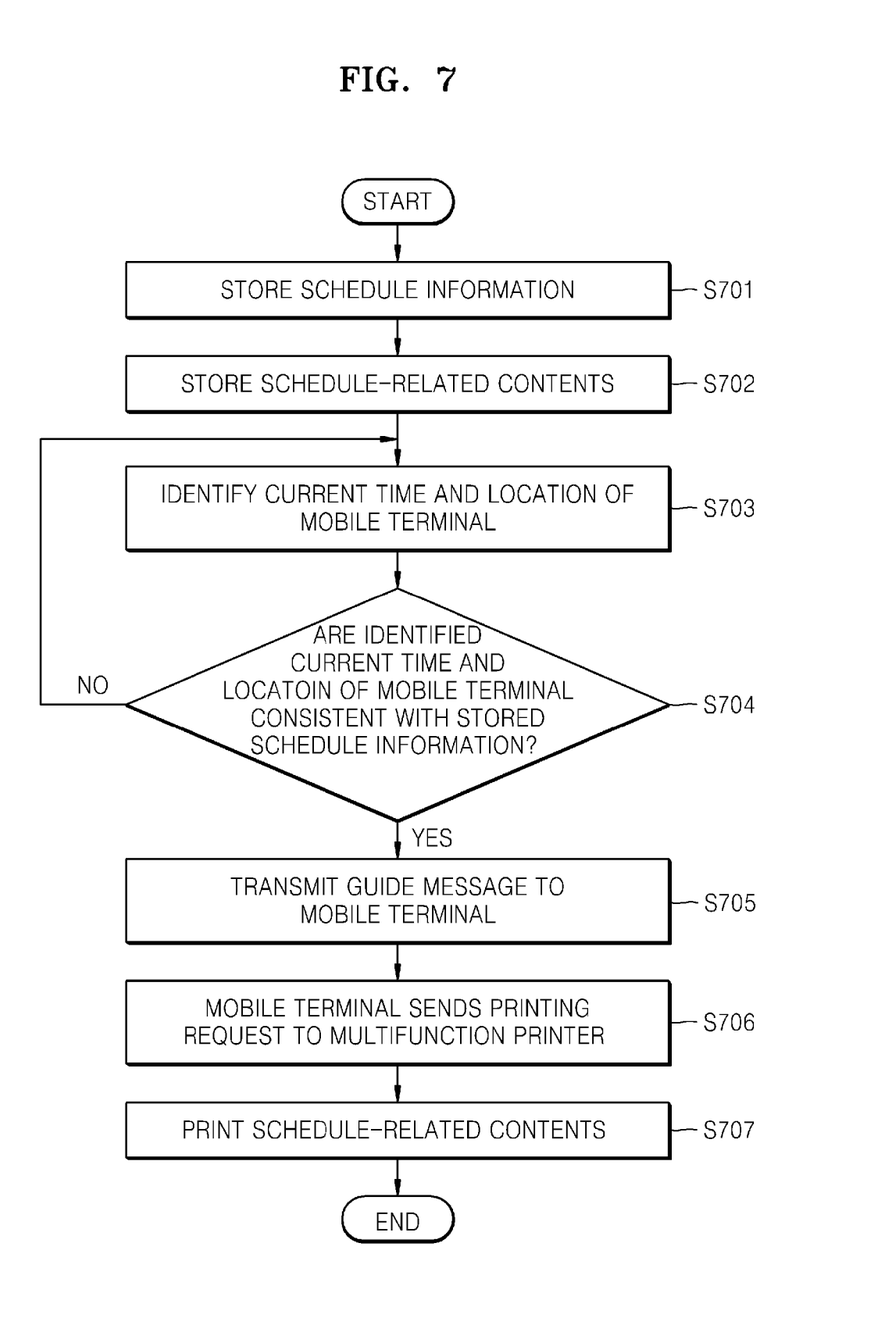
FIG. 7 is a flowchart of a context-aware printing service providing method, according to an embodiment.

FIG. 7 is a flowchart of context-aware printing service providing method according to an embodiment. Referring to FIG. 7, schedule information is stored in operation S701. The schedule information refers to information including the contents, location and time of a schedule performed by a user. In operation S702, contents related with the schedule are stored. The schedule-related contents denote contents necessary to perform the schedule, an example of which is documents necessary for a meeting.

When the schedule information and the schedule-related contents are stored, the current time and the location of the user are identified in operation S703. At this time, the location of a mobile terminal that the user carries is identified, and the identified location of the mobile terminal may be considered as that of the user. In operation S704, it is determined whether the identified time and location are consistent with the schedule information stored in operation S701. When the time and the location are not consistent with the schedule information, operation S703 is repeated. If the time and the location are consistent with the schedule information, operation S705 is proceeded to transmit a guide message to the mobile terminal. In this regard, the guide message may include the information that there are contents related with the schedule, and may also include the identification information of a multifunction printer capable of printing out the schedule-related contents.

After receiving the guide message, if the mobile terminal sends a printing request to the multifunction printer in operation S706, the multifunction printer in operation S707 prints out the schedule-related contents stored in operation S702. Alternatively, if there is a printing request sent by the mobile terminal, authentication may be performed, and then the printing may be performed after the authentication is succeeded. A detailed description of this alternative example will now be given with reference to FIG. 8.

Figure 8:
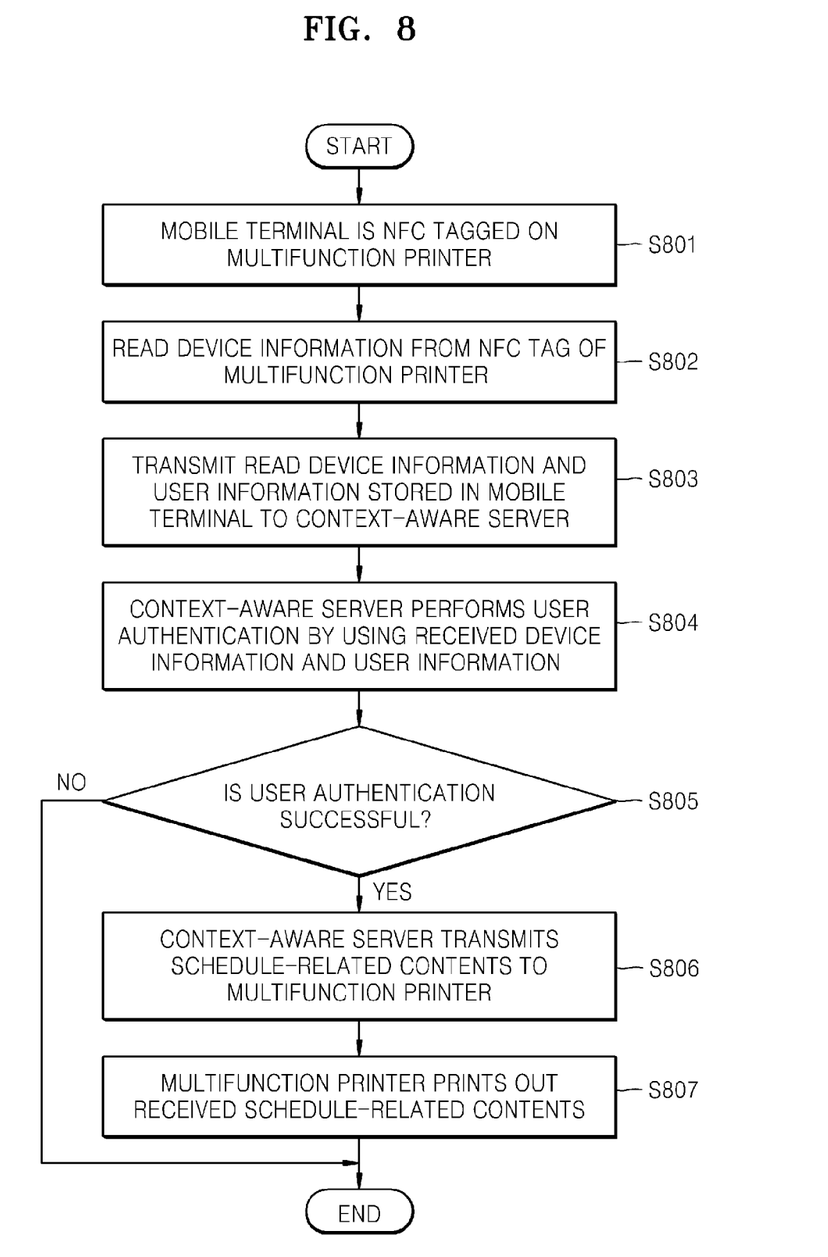
FIG. 8 is a flowchart describing an operation of performing user authentication at the request of a mobile terminal for printing in the context-aware printing service according to an embodiment.

FIG. 8 is a flowchart of an operation of performing user authentication according to a printing request sent by the mobile terminal in the context-aware printing service, according to an embodiment. Referring to FIG. 8, the mobile terminal sends a printing request to the multifunction printer by performing NFC tagging in operation S801. That is, the user may access the multifunction printer designated by the guide message received from the mobile terminal, and may approach the mobile terminal to the multifunction printer to simply request the multifunction printer to print out the schedule-related contents.

If the printing request is performed through NFC tagging, the mobile terminal reads device information of the multifunction printer stored in an NFC tag of the multifunction printer, in operation S802. The device information may include a media access control (MAC) address and a device name of the multifunction printer. In operation S803, the mobile terminal transmits, to a context-aware server, the read device information along with user information pre-stored in the mobile terminal. The context-aware server performs the user authentication by using the received device information and the user information, in operation S804.

In operation S805, it is determined whether the user succeeds in the user authentication. If the user fails in the user authentication, the method is concluded. On the other hand, if the user succeeds in the user authentication, operation S806 may be proceeded, in which the context-aware server transmits the contents related with the schedule to the multifunction printer. Lastly, the multifunction printer prints the received contents in operation S807.

A plurality of users sharing an identical schedule may be managed as one group, and a description thereof which will now be given with reference to FIG. 9.

Figure 9:
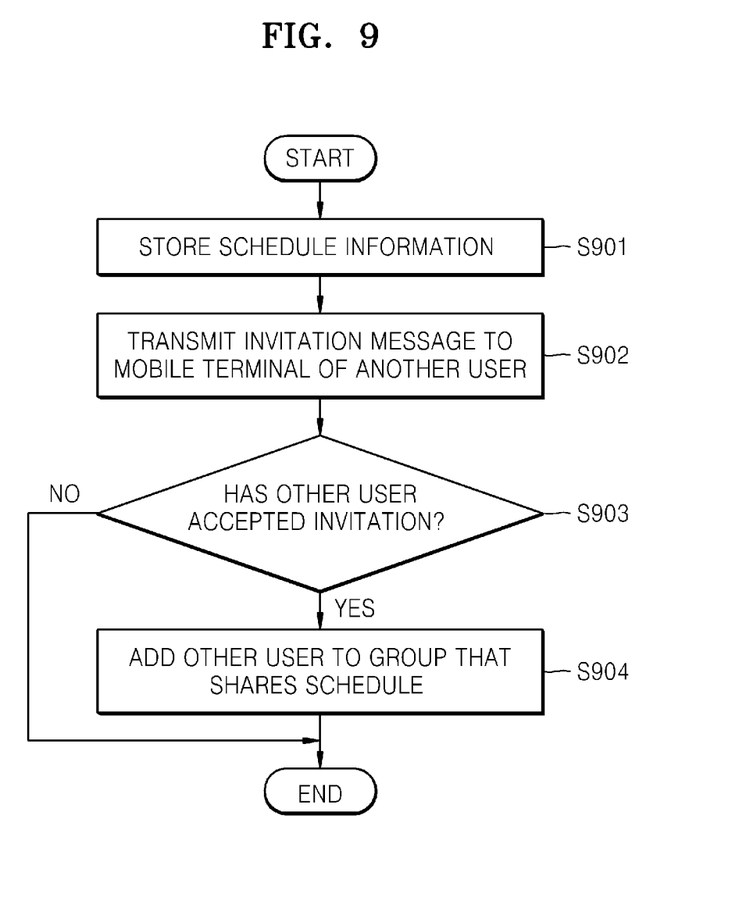
FIG. 9 is a flowchart of a method of adding users who share a schedule in the context-aware printing service according to an embodiment.

FIG. 9 is a flowchart of a method of adding users who share a schedule in the context-aware printing service, according to an embodiment. Referring to FIG. 9, schedule information related with a user is stored in operation S901. When the schedule information is stored, the user sends an invitation message to a mobile terminal of another user, in operation S902. For example, information about a time and a location of a meeting corresponding to the schedule together with a message inquiring whether the user will participate in the meeting may be transmitted.

In operation S903, it is determined whether the inquired user accepts the invitation. If the invitation is not accepted, the method is concluded. On the other hand, if the invitation is accepted, then operation S904 is proceeded and the inquired user is added to a group that shares the schedule. Due to the registration of a plurality of users for a single schedule and management of the users as a single group, a more efficient service may be provided.

Processes, functions, methods, and/or software in apparatuses described herein may be recorded, stored, or fixed in one or more non-transitory computer-readable storage media (computer readable recording medium) that includes program instructions (computer readable instructions) to be implemented by a computer to cause one or more processors to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a non-transitory computer-readable storage medium may be distributed among computer systems connected through a network and computer-readable codes or program instructions may be stored and executed in a decentralized manner. In addition, the computer-readable storage media may also be embodied in at least one application specific integrated circuit (ASIC) or Field Programmable Gate Array (FPGA).

While embodiments have been described with reference to the figures, it will be understood by those of ordinary skill in the art that various changes in form and details may be made therein without departing from the spirit and scope of the present disclosure as defined by the following claims and their equivalents.

What is claimed is:

1. A method of providing a context-aware printing service, the method comprising:
    storing schedule information of a user;
    storing contents related with the schedule;
    identifying a location of a mobile terminal of the user and a current time;
    determining whether the identified location and the identified time are consistent with the schedule information;
    transmitting a guide message for printing out the contents to the mobile terminal if the identified location and the identified time are consistent with the schedule information;
    sending, by the mobile terminal, a printing request to an image forming apparatus; and
    printing out the contents using the image forming apparatus.

2. The method of claim 1, wherein:
    schedule information is stored in a schedule management server;
    the contents are stored in a content management server; and
    a context-aware server is linked with the schedule management server and the content management server in order to acquire the schedule information and the contents.

3. The method of claim 2, wherein the context-aware server identifies the location of the mobile terminal based on a location of an access point accessed by the mobile terminal in the operation of identifying the location of the mobile terminal.

4. The method of claim 2, wherein the context-aware server determines during the determining operation whether a location and a time of the schedule that are included in the schedule information are consistent with the identified location and the identified time.

5. The method of claim 2, the guide message, which includes information that there are the contents related with the schedule and identification information of an image forming apparatus capable of printing out the contents, is transmitted in the transmission operation.

6. The method of claim 2, wherein the mobile terminal is near field communication (NFC) tagged on the image forming apparatus in the sending operation.

7. The method of claim 6, wherein the printing of the contents comprises:
    performing, by the context-aware server, user authentication;
    transmitting, by the context-aware server, the contents to the image forming apparatus if the user authentication is succeeded; and
    printing out the received contents, wherein the printing is performed by the image forming apparatus.

8. The method of claim 7, wherein the performing of the user authentication comprises:
    receiving, by the mobile terminal, device information stored in an NFC tag of the image forming apparatus;
    transmitting the received device information and user information stored in the mobile terminal to the context-aware server; and
    performing, by the context-aware server, the user authentication by using the device information and the user information.

9. The method of claim 2, further comprising:
    registering other users who share the schedule information to the schedule management server; and
    providing the registered users with authority to store the contents related with the schedule in the content management server.

10. The method of claim 1, wherein at least one of the image forming apparatus and the mobile terminal provides a preview of the contents before printing out the contents.

11. At least one non-transitory computer readable medium storing computer readable instructions which when executed control at least one processor to implement the method of claim 1.

12. A system for providing a context-aware printing service, the system comprising:
    a mobile terminal;
    a schedule management server to store schedule information of users;
    a content management server to store contents related to the schedule information stored in the schedule management server;
    a context-aware server to acquire the schedule information and the contents, identify a location of the mobile terminal and current time, determine whether the identified location and the identified time is consistent with the stored schedule information, and transmit a guide message to print out the contents to the mobile terminal; and
    an image forming apparatus to print the contents according to a printing request sent by the mobile terminal.

13. The system of claim 12, wherein the context-aware server identifies a location of the mobile terminal based on a location of an access point accessed by the mobile terminal.

14. The system of claim 12, wherein the context-aware server determines whether a location and time of the schedule included in the schedule information is consistent with the identified location and the identified time.

15. The system of claim 12, wherein a message transmitted by the context-aware server to the mobile terminal comprises the information that there are contents related to the schedule information and identification information of the image forming apparatus capable of printing out the contents.

16. The system of claim 12, wherein the mobile terminal sends a printing request by being NFC (near field communication) tagged on the image forming apparatus.

17. The system of claim 16, wherein the context-aware server transmits the contents to the image forming apparatus when the user authentication is successfully performed by the context-aware server.

18. The system of claim 17, wherein:
the device information stored in a near field communication (NFC) tag of image forming apparatus is received by the mobile terminal;
the received device information and the user information stored in the mobile terminal is transmitted by the mobile terminal to the context-aware server; and
the user authentication is performed using the context aware-server based upon the received device information and the user information.

19. The system of claim 12, wherein:
other users who share the schedule information are additionally registered to the schedule management server; and
the additionally registered users have the authority to store the contents related with the schedule in the content management server.

20. The system of claim 12, wherein at least one of the image forming apparatus and the mobile terminal provide a preview of the schedule information before printing out the contents.

* * * * *